(12) United States Patent
McGrew et al.

(10) Patent No.: US 7,418,100 B2
(45) Date of Patent: Aug. 26, 2008

(54) ENCIPHERING METHOD

(75) Inventors: David A. McGrew, Poolesville, MD (US); Scott Fluhrer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 11/201,626

(22) Filed: Aug. 10, 2005

(65) Prior Publication Data

US 2007/0081668 A1    Apr. 12, 2007

Related U.S. Application Data

(60) Provisional application No. 60/620,877, filed on Oct. 20, 2004.

(51) Int. Cl.
*H04K 1/06* (2006.01)
*H04L 9/28* (2006.01)

(52) U.S. Cl. .......................................... 380/37; 380/28

(58) Field of Classification Search .................. 380/28, 380/37
See application file for complete search history.

(56) References Cited

U.S. PATENT DOCUMENTS

| | | | |
|---|---|---|---|
| 6,061,449 A * | 5/2000 | Candelore et al. ............. | 380/28 |
| 7,113,594 B2 | 9/2006 | Bonch et al. | |
| 2002/0046339 A1 | 4/2002 | Bellare et al. | |
| 2002/0051537 A1 | 5/2002 | Rogaway | |
| 2002/0071552 A1 | 6/2002 | Rogaway | |
| 2003/0123667 A1 * | 7/2003 | Weber et al. ................ | 380/277 |
| 2004/0131182 A1 | 7/2004 | Rogaway | |

OTHER PUBLICATIONS

Anderson, Ross et al., "Two Practical and Provably Secure Block Ciphers: Bear and Lion," Technion Computer Science Department, Technical Report CS0875, 1995, 8 pages.
Bellare, Mihir et al., "On the Construction of Variable-Input-Length Ciphers," Proceedings of the 6th Workshop on Fast Software Encryption, Apr. 22, 1999, 13 pages.
Dolev, Danny, et al., "Nonmalleable Cryptography," SIAM J. Comput., vol. 30, No. 2, Jun. 3, 2000, pp. 391-437.
Halevi, Shai, "EME: Extending EME to Handle Arbitrary-Length Messages with Associated Data—preliminary report," Proceedings of Indocrypt 2004, May 27, 2004, 32 pages.
Lucks, Stefan, "Faster Luby Rackoff Ciphers," Fast Software Encryption, LNCS1039, SpringerVerlag, 1996, pp. 189-203.

(Continued)

*Primary Examiner*—Nasser G. Moazzami
*Assistant Examiner*—Brandon S Hoffman
(74) *Attorney, Agent, or Firm*—Hickman Palermo Truong & Becker LLP

(57) ABSTRACT

A block cipher mode of operation implements a block cipher with an arbitrary block length and provides output ciphertext that is always the same size as the input plaintext. The mode can provide the best possible security in systems that cannot allow data expansion, such as disk-block encryption and some network protocols. The mode accepts an additional input, which can be used to protect against attacks that manipulate the ciphertext by rearranging the ciphertext blocks. The universal hash function from Galois/Counter Mode of operation for block ciphers may be used in an embodiment for hardware and software efficiency.

29 Claims, 6 Drawing Sheets

OTHER PUBLICATIONS

Maurer, Ueli, "Luby-Rackoff Ciphers from Weak Round Functions?—Full Version," Cryptology ePrint Archive, Report 2006/213, Jun. 2006, 33 pages.

McGrew, David et al., "The ABL Mode of Operation," PowerPoint Presentation, Oct. 2004, 9 pages.

McGrew, David A., et al., "Arbitrary Block Length (ABL) Mode," PowerPoint Presentation, CMU Oct. 11, 2004, 10 pages.

Naor, Moni et al., "On the Construction of Pseudo-Ransom Permutations: Luby-Rackoff Revisited," Proceedings of the twenty-ninth annual ACM symposium on Theory of computing, 1997, pp. 189-199.

Patel, Sarvar, et al., "Towards making Luby-Rackoff Ciphers Optimal and Practical," Proceedings of the 6th International Workshop on Fast Software Encryption, 1999, 21 pages.

Patel, Sarvar, et al , "Efficient Constructions of Variable-Input-Length Block Ciphers," Proceedings of Selected Areas in Cryptography (SAC), Aug. 2004, 15 pages.

Rogaway, Phillip, "The EMD Mode of Operations (A tweaked, Wide-Blocksize, Strong PRP)," Cryptology ePrint Archive: Report 2002/148, Sep. 26, 2002, 23 pages.

Patel, Sarvar, et al., "Luby-Rackoff Cipher: Why XQR Is Not So Exclusive," 9th Annual International Workshop on Selected Areas in Cryptography, 2002, 28 pages.

Liskov, Moses, et al., "Tweakable Block Ciphers", XP-002456592, Copyright Springer-Verlag Berlin Heidelberg, 2002, 16 pages.

McDrew, David A., et al., "The Galois/Counter Mode of Operation (GCM)", XP-002456593, Cisco Systems, 2004, retrieved from website: http://www.cryptobarn.com/papers/gcm-spec.pdf, 43 pages.

McGrew, David A., et al., "The Extended Codebook (XCB) Mode of Operation", Cisco Systems, XP-002456590, retrieved from website: http://eprint.iacr.org/2007/298.pdf, 2007, 17 pages.

Halevi, Shai, "EME: Extending EME to Handle Arbitrary-Length Messages with Associated Date", XP-002456591, Copyright Springer-Verlag Berlin Heidelberg, 2004, 32 pages.

McGrew D A et al., "The Extended Codebook (XCB) Mode of Operation," Cisco Systems, Inc., San Jose, CA US, Oct. 25, 2004, 15 pages.

Liskov M et al., "Tweakable Block Ciphers," Advances in Cryptology—Crypto 2002, 22nd Annual Int'l Cryptology Conference, Proceedings, Springer-Verlag (Santa Barbara, CA US) Lecture Notes in Computer Science, vol. 2442, Aug. 22, 2002, pp. 31-46.

McGrew D A et al., "The Galois/Counter Mode of Operation (GCM)," Submission to NIST Modes of Operation Process, Jan. 2004, pp. 1-41.

Carnerero Alvaro F, Supplementary European Search Report, European Patent Office, Berlin, Germany, Nov. 8, 2007, 5 pages.

\* cited by examiner

ENCIPHERING METHOD

CROSS-REFERENCE TO RELATED APPLICATIONS; PRIORITY CLAIM

This application is related to and claims domestic priority under 35 U.S.C. 119(e) from prior provisional application Ser. No. 60/620,877, filed Oct. 20, 2004, "Enciphering Method," of inventors David McGrew et al., the entire contents of which are hereby incorporated by reference as if fully set forth herein.

FIELD OF THE INVENTION

The present invention generally relates to data processing. The invention relates more specifically to computer-implemented cryptography.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An encryption method is length-preserving if the ciphertext has exactly the same number of bits as the plaintext. Such a method must be deterministic, since it is impossible to accommodate random data (such as an initialization vector) within the ciphertext. Further, deterministic length-preserving encryption is well suited to certain applications. For example, in some encrypted database applications, determinism is essential to ensure that plaintext values in a lookup operation exactly correspond to previously stored ciphertext values.

Further, in some applications of cryptology, it is not possible to provide certain desirable security services, such as message authentication on data, because it is not possible to expand the data to include a message authentication code. For example, the Secure Real Time Protocol (SRTP) in some networks (for example, some wireless network scenarios) cannot expand the plaintext data. Length-preserving algorithms essentially implement a codebook; repeated encryptions of the same plaintext with the same key result in identical ciphertext. An adversary gains knowledge about the plaintext by seeing which ciphertext values match. Nevertheless, in some scenarios length-preserving encryption is still useful. For example, length preservation may enable encryption to be introduced into data processing systems that are already implemented and deployed, or used in protocols that have fixed-width fields, or in systems that limit the allowed amount of data expansion. In these situations, as an alternative to message authentication, a length-preserving, deterministic, nonmalleable encryption method is desirable.

Informally, a cipher is nonmalleable if changing a single bit of a ciphertext value affects all of the bits of the corresponding plaintext. Thus, in nonmalleable encryption it is impossible to manipulate the appearance of plaintext after decryption by manipulating the ciphertext. More formally, a desirable nonmalleable cipher implements a pseudorandom permutation; it is indistinguishable from a permutation on the set of messages to a computationally bounded adversary. It is desirable for such a cipher to handle plaintexts of variable size, and therefore there is a need for a cipher that provides a pseudorandom arbitrary length permutation: for each of the possible plaintext lengths, the cipher acts as a pseudorandom permutation.

Nonmalleable encryption is a significant improvement over conventional modes of operation, such as cipher block chaining and counter-mode encryption, whenever adding a message authentication tag is impossible. In addition, a nonmalleable cipher can also accept an additional input value that can be used to prevent ciphertext-substitution attacks. For example, an SRTP sequence number can be used in implementations that are associated with network elements running SRTP.

Nonmalleable encryption also is useful for disk-block encryption. Such encryption is often used in remote storage systems, since it allows storage area networks to be used in applications in which the administrator of the network is trusted only to a limited extent.

There have been many nonmalleable cipher proposals in the theoretical literature. An embodiment of the approach disclosed herein, which may be referred to as an extended codebook (XCB) mode of operation for block ciphers, differs from prior work in several ways. A cipher proposed by Luby and Rackoff in the 1980s ("LR" herein) provides a theoretical basis for much past work in nonmalleable ciphers. XCB is different from this work in that uses a different set of computations; XCB is not a Fesitel cipher, while LR is. XCB relies on the invertibility of the block cipher, while LR does not. Also, LR needs four rounds to be secure, while XCB is secure with three.

In the 1990s, Naor & Reingold published some optimizations on the basic idea, as described in "On the Construction of Pseudo-Random Permutations: Luby Rackoff Revisited". This work uses four rounds, but has the first and fourth be "pairwise independent" permutations, as defined by Naor & Reingold. The Naor-Reingold approach also does not rely on the invertibility of the block cipher. This design is completely different than XCB, which just uses three rounds, does not use pairwise independent permutations, and does rely on the invertibility of the block cipher.

In the 1990s, Stefan Lucks described the use of hash functions in "Faster Luby-Rackoff Ciphers". Anderson and Biham also published some similar work, showing two ciphers BEAR and LION. This work discusses only LR constructions, and does not rely on the invertibility of the block cipher. Furthermore, it requires four rounds in order to be secure.

More recently, Patel, Ramzan, Sundaram published two papers that extend the Naor-Reingold work, "Towards Making Luby-Rackoff Ciphers Optimal and Practical" and "Luby-Rackoff Ciphers over Finite Algebraic Structures or Why XOR is not so Exclusive". This work builds on that of Naor-Reingold, and all of the comments for that work apply to these designs.

Bellare and Rogaway described a mode of operation that is length-preserving, but is not nonmalleable, in "On the Construction of Variable-Input-Length Ciphers". They call this work VIL, and it differs significantly from XCB.

Rogaway and Halevi designed the EME mode of operation, which is nonmalleable, in "The EMD Mode of Operation (A Tweaked, Wide-Blocksize, Strong PRP)" and "EME ?: extending EME to handle arbitrary-length messages with associated data". This work has goals that are identical to that of XCB, but the design of EME is different from that of XCB. Importantly, EME requires twice as many invocations of the block cipher as XCB.

Independently, McGrew and Viega submitted an optimized Luby-Rackoff design called ABL (Arbitrary Block Length Mode) to the IEEE Security in Storage Working Group. XCB is significantly different from ABL.

Patel et al. have published a paper entitled "Efficient Constructions of Variable-Input-Length Block Ciphers" that describes two cipher constructions. The approach of Section 3 is structured such that the hash invocation (round 1) and the block cipher invocation (round 2) cannot be done in parallel. In contrast, in XCB the first two rounds can be done in parallel. The ability for XCB to do these operations simultaneously is a significant performance benefit to a high-speed hardware implementation. Further, the Section 3 cipher has only a single hash function application and a single block cipher invocation, outside of the "counter mode" used in round 3. Because of this, it is not secure against chosen plaintext/ciphertext attacks. Thus, the Section 3 approach provides only a pseudorandom permutation, not a "super pseudorandom permutation." In contrast, XCB has two hash invocations and two block cipher invocations, and is a super pseudorandom permutation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
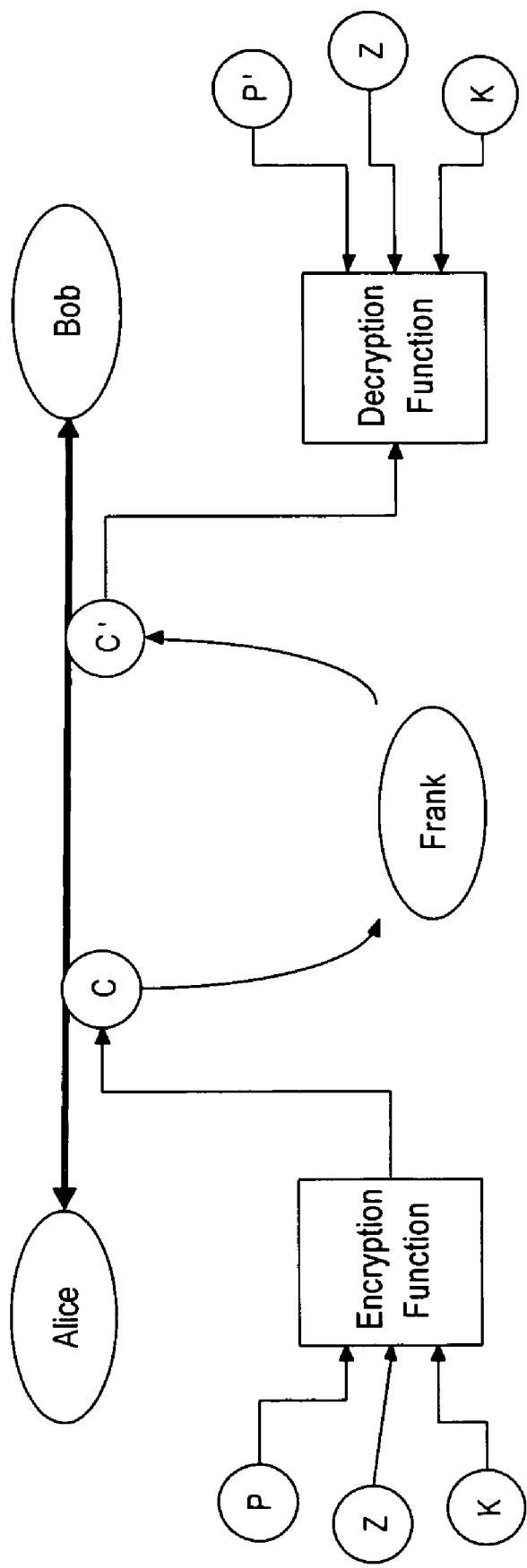
FIG. 1A is a block diagram providing a model of a communication system that can use the approach herein.

A method and apparatus for enciphering are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Conceptual Model and Goals
3.0 Extended Codebook (XCB) Mode of Operation for Block Ciphers
  3.1 Principle of Operation
  3.2 Example Applications
  3.3 Proof of Security
  3.4 Certain Differences In View Of Prior Approaches
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, an enciphering method comprising the computer-implemented steps of receiving plaintext data; separating the plaintext data into a first plaintext data segment A and a second plaintext data segment B; encrypting the first plaintext data segment A using block cipher encryption and a first key, resulting in creating a first encrypted segment C; applying an exclusive OR operation to the first encrypted segment C and a hash of the second plaintext data segment B and an associated data element Z based on a second key, resulting in creating a first intermediate result datum D; applying an encryption operation to the first intermediate result datum D and a third key, resulting in creating an encryption output; applying an exclusive OR operation to the encryption output and the second plaintext data segment B, resulting in creating a second intermediate result datum E; applying an exclusive OR operation to the first intermediate result datum D and a hash of the second intermediate result and the associated data element Z using a fourth key, resulting in creating a third intermediate result datum F; and creating, as an output ciphertext, a concatenation of the second intermediate result datum E and a decryption of third intermediate result datum F using a fifth key.

The data value labels specified herein are used purely for clarity and convenience in this description, but are otherwise arbitrary; embodiments and implementations may use any form of labeling or naming for the subject data values.

In one feature, the second key, third key, fourth key, and fifth key are determined based on the first key and a key derivation process. In another feature, deciphering the ciphertext involves performing the steps above in inverse order. In another feature, the plaintext comprises a block of data for storage in a non-volatile memory, and the ciphertext is stored in the non-volatile memory. Additionally or alternatively, the plaintext comprises a block of data for storage in a disk drive device, and the ciphertext is stored in the disk drive device.

In yet another feature, the plaintext comprises a data payload of a packet that conforms to a non-expandable data protocol, and the ciphertext is stored in the packet. In still another feature, the plaintext comprises a data payload of a packet that conforms to Secure RTP, and the ciphertext is stored in the packet.

In various features, the encryption operation used to compute D from C and to compute F from D may be AES counter-mode encryption, or AES OFB block cipher mode.

In other aspects, the invention encompasses a computer apparatus and a computer-readable medium configured to carry out the foregoing steps.

In these approaches, a block cipher mode of operation implements a block cipher with an arbitrary block length and provides output ciphertext that is always the same size as the input plaintext. The mode can provide the best possible security in systems that cannot allow data expansion, such as disk-block encryption and some network protocols. The mode accepts an additional input, which can be used to protect against attacks that manipulate the ciphertext by rearranging the ciphertext blocks. The universal hash function from Galois/Counter Mode of operation for block ciphers may be used in an embodiment for hardware and software efficiency.

2.0 Conceptual Model and Goals

FIG. 1A is a block diagram providing a model of a communication system that can use the approach herein. A first node Alice is coupled to a second node Bob by a non-secure communications link L. Unknown to Alice and Bob, a third node Frank can intercept messages sent on link L.

Alice sends Bob a series of messages, each of which is associated with certain additional data Z, which may contain a nonce, and which may contain information about how the message is to be routed, processed, or handled by the network and other intermediate systems between the sender and receiver. Alice encrypts a plaintext message P using a secret key K and using Z as an auxiliary input to an encryption function, yielding a ciphertext C. Alice sends C to Bob on link L; however, Frank intercepts C and sends a substitute message C' to Bob. Message C' is equal to C if Frank does not change the ciphertext. Bob decrypts C' to P' with a decryption function using the secret key K shared with Alice and the value Z of the associated data. Z is either contained in a non-ciphertext portion of the message, or can be inferred. If C'=C, then P'=P; otherwise, P' is expected to be indistinguishable from random.

If the encryption and decryption functions are denoted E and D, respectively, then symbolically, the model of FIG. 1A and the preceding sequence may be represented as:

$$C=E(K, Z, P)$$

$$P=D(K, Z, C)$$

The cipher used in C and E is secure if the value P'=D (K, C', Z') is indistinguishable from random whenever C'≠C or Z'≠Z. Thus, any change to the ciphertext causes the ciphertext to decrypt to unpredictable random values that do not communicate useful information or the plaintext.

Implementations of encryption methods that support this model typically have the following goals:
- to have ciphertext that is exactly the same size as the plaintext;
- the ability to encrypt any size buffer, that is, any number of bits greater than zero;
- to have a decryption output that is indistinguishable from random under manipulation of the ciphertext or the associated data;
- to require a fixed-width block cipher as the only cryptographic primitive.

Further, those creating commercial implementations of such encryption methods may additionally have the following goals, which are desirable but not required in an embodiment:
- to have strong, provably secure bounds under standard assumptions;
- to have minimal computational costs, and
- to support maximum parallelization.

3.0 Extended Codebook (XCB) Mode of Operation For Block Ciphers 3.1 Principle of Operation —First Embodiment—Key Per Round According to an embodiment, an extended codebook mode of operation acts as an arbitrary length block cipher with associated data. For purposes of illustrating a clear example, the description herein assumes that a 128-bit block cipher is used. Embodiments can be used with other block cipher widths if a finite field of the appropriate size is defined.

Figure 1B:
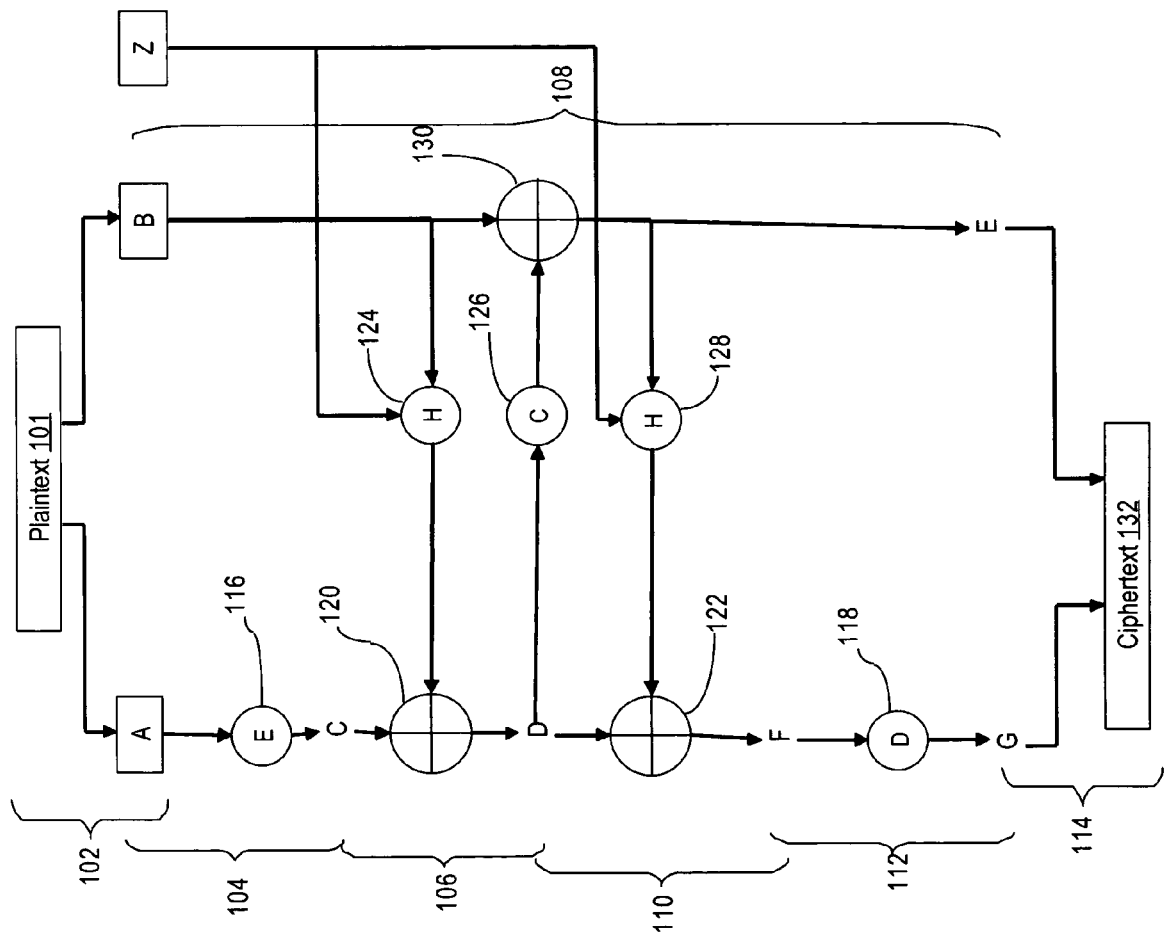
FIG. 1B is a data flow diagram illustrating steps and elements of an encryption process, according to one embodiment.

FIG. 1B is a data flow diagram illustrating steps and elements of an encryption process, according to one embodiment. Generally, the process of FIG. 1B receives information for enciphering, and enciphers such Plaintext 101 using the computational operations and transformations shown in FIG. 1B, to result in creating output Ciphertext 132. Both the Plaintext 101 and Ciphertext 132 may comprise any form of data representation, such as a string of bits, a block of disk storage, etc.

As seen in FIG. 1B, at step 102, the Plaintext 101 is separated into two portions denoted A and B. In one embodiment, for plaintexts of at least 256 bits in size, the plaintext 101 is separated into two halves A and B, in which A is the first 128 bits of the plaintext and B is the remainder of the plaintext. An additional data value Z is also received. The additional value Z may be received in the clear and may comprise any auxiliary input value. The additional value Z may have any length. This approach prevents some attacks that rely on the codebook property, since identical plaintext values encrypted with distinct values of Z yield unrelated ciphertext values. In one embodiment applied to enciphering stored information, Z is a disk block number. In an embodiment applied to network communications, Z may be a message sequence number, and in such an embodiment the use of Z protects against replay attacks.

At step 104, portion A is encrypted with an encryption operation 116 and a first key value to yield a first intermediate value C. Symbolically, step 104 is: C←E($K_0$, A).

At step 106, a second intermediate value D is computed as: D←C XOR H($K_1$, B, Z) using a first XOR operation 120 and a first hash operation 124. In this expression, H is a hash function. In one embodiment, the GHASH algorithm as defined by Galois in Galois/Counter Mode (GCM) of operation for block ciphers may be used for hashing in the hash operations 124, 128. The use of the GCM hash function provides efficiency in both hardware and software and allows for the potential re-use of prior implementation efforts. In other embodiments, any pseudo-random hash function may be used for hash operations 124, 128.

At step 108, a first ciphertext portion E is computed as: E←B XOR CTR($K_2$, D), using second XOR operation 130 and encryption operation 126. In one embodiment, CTR and encryption operation 126 comprise use of Advanced Encryption Standard (AES) counter-mode encryption. In another embodiment, OFB may be used at step 108 and for encryption operation 126; OFB is one of the four DES modes of operation. When counter mode is used, the counter mode encryption operation is configured to generate an output having a size that is identical to the target data into which the counter mode output is combined with an XOR operation, as described next. In alternate embodiments, operation 126 may be any block cipher.

At step 110, a third intermediate value F is computed as F←D XOR H($K_3$, E, Z), using a second hash function 128 and a third XOR operation 122. Second hash operation 128, and H in the immediately preceding expression, is the same hash function as used in step 106. At step 112, a second ciphertext portion G is determined using a decryption operation 118 as G←D($K_4$, F).

At step 114, completed Ciphertext 132 is created by concatenating G and E. The resulting ciphertext 132 may be stored in a network protocol message, stored in a disk storage device, or used in a variety of other computer-based applications. Using the approaches herein, the ciphertext 132 has the same length as the plaintext 101.

In this description, E represents the block cipher encryption of the value X as an element of the set $\{0, 1\}^w$ with the key K as an element of the set $\{0, 1\}^k$, and D(K,X) represents the block cipher decryption of the value X as-an element of the set $\{0, 1\}^w$ with the key K as an element of the set $\{0, 1\}^k$. The decryption operation D is identical to the encryption operation E, except that the three rounds are run in reverse order.

The encryption and decryption operations 116, 118 may comprise any pseudorandom permutation; they need not have a relationship as encryption and decryption operations. The encryption and decryption operations 116, 118 may be implemented in hardware, software, firmware, or a combination. In a hardware implementation, the same circuit can implement both encryption and decryption operations 116, 118 if the keys $K_1$, $K_4$ are inverted in the respective operations. Further, in another embodiment, the encryption and decryption operations 116, 118 each may comprise any pseudo-random permutation operation and need not have an encryption-decryption relationship.

Each of the keys $K_0$ to $K_4$ described in the approach herein may comprise a first key and a plurality of other keys that are mathematically or computationally derived from the first key. In this approach, fewer key sharing operations are needed before enciphering begins. Alternatively, all keys may be provisioned to the participating processing elements in advance, using any known key distribution mechanism.

3.2 Second Embodiment—Single Key

Figure 2A:
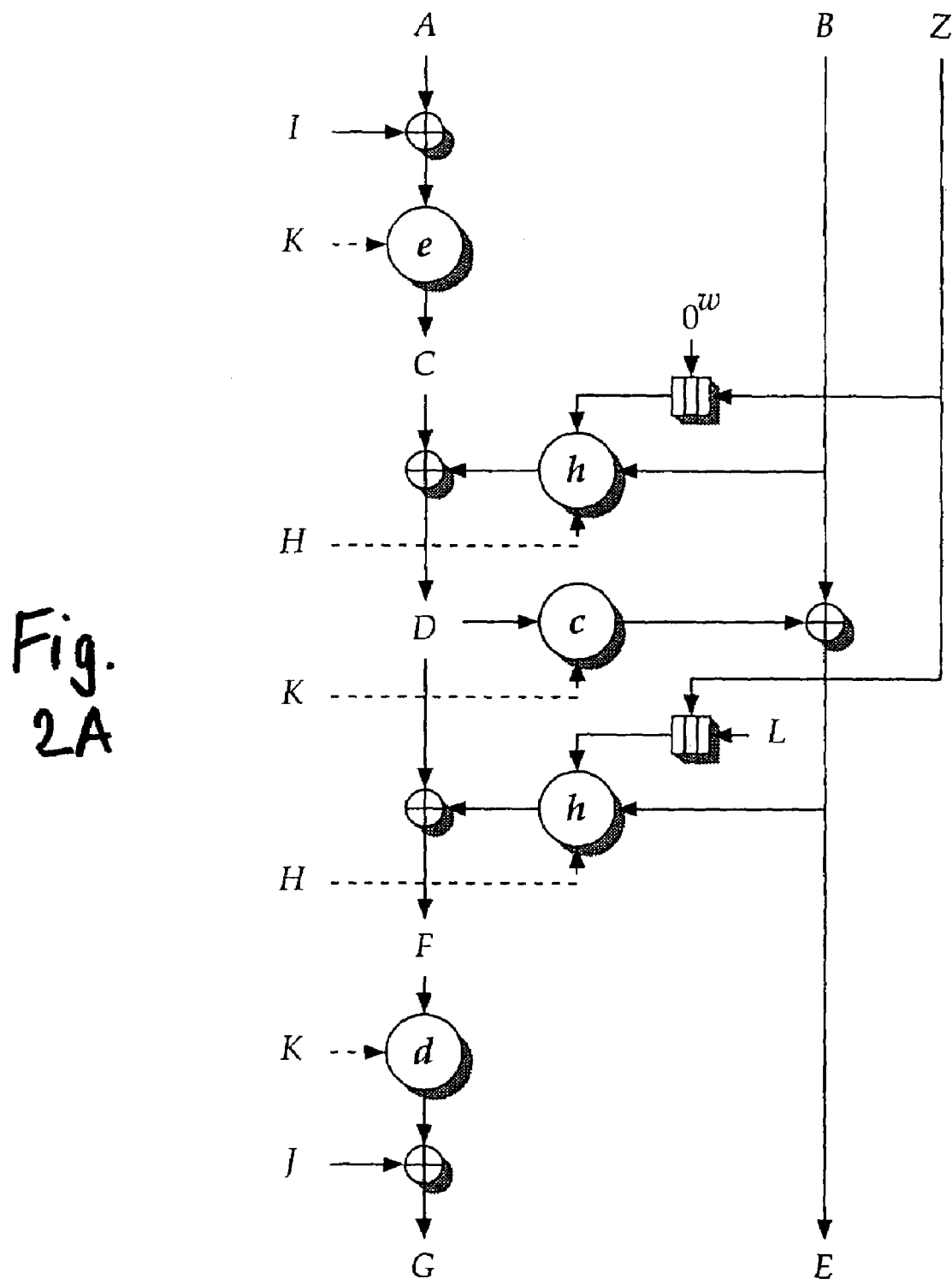
FIG. 2A is a block diagram of an encryption operation of the second embodiment.
Figure 2B:
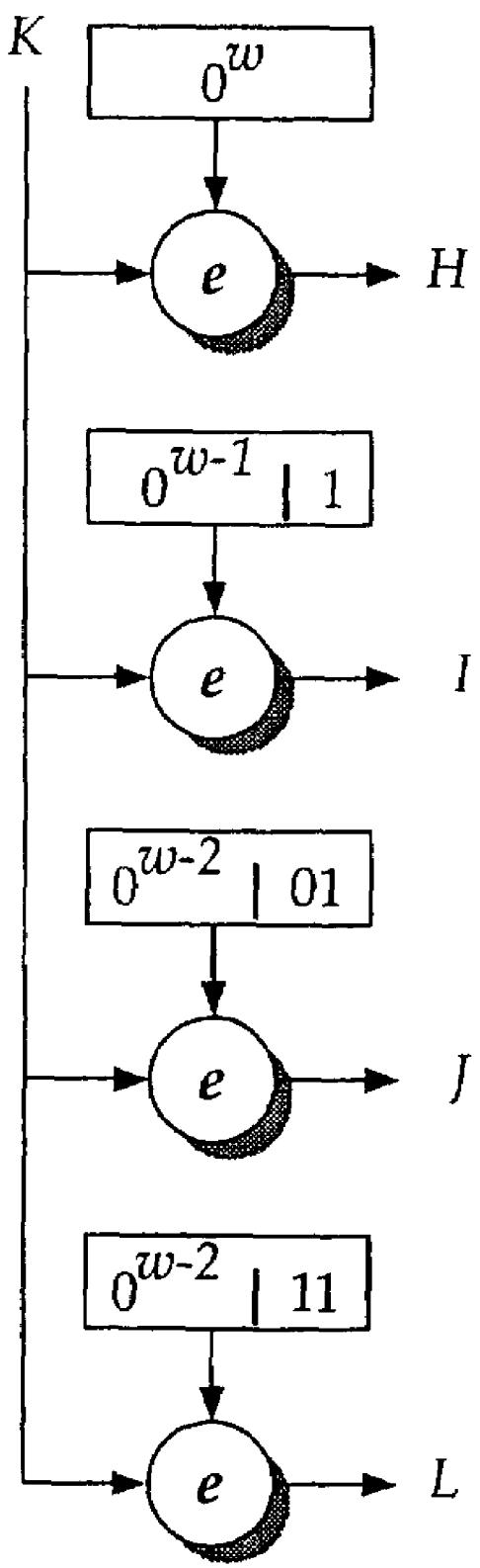
FIG. 2B is a block diagram of a multiplication operation.

According to another embodiment, an extended codebook mode of operation acts as an arbitrary length block cipher with associated data, but a single key is used rather than a key per round. FIG. 2A is a block diagram of an encryption operation of the second embodiment and FIG. 2B is a block diagram of a multiplication operation. For purposes of illustrating a clear example, the description herein assumes that a 128-bit block cipher is used. Embodiments can be used with other block cipher widths if a finite field of the appropriate size is defined.

The number of bits in the block cipher inputs and outputs is denoted w. The value of w is 128 when AES is used. The multiplication of two elements $X, Y \in GF(2^{128})$ is denoted as $X \cdot Y$, and the addition of X and Y is denoted $X \oplus Y$. Addition in this field is equivalent to the bitwise exclusive-or operation. An example multiplication operation is defined in a separate section below.

In the algorithmic description, the function len(s) returns a 64-bit string containing the non-negative integer describing the number of bits in its argument S, with the least significant bit on the right. The expression $0^1$ denotes a string of 1 zero bits, and A||B denotes the concatenation of two bit strings A and B. Bit strings are considered indexed starting on the left, so that bit zero of S is the leftmost bit. When S is a bit string and $0<=a<b<=len(S)$, then S[a; b] denotes the length b-a substring of S consisting of bits a through b of S. The symbol {} denotes the bit string with zero length.

An extended codebook encryption operation is defined in Table 1, a decryption operation is defined in Table 2, and the encryption operation is also illustrated in FIG. 2A. The algorithms of Table 1 and Table 2 use the block cipher encryption functions e and d, as well as the hash function h and the pseudorandom function c. The variables H, I, J, and L are derived from K by running the function e in counter mode, as shown in FIG. 2B. Optionally, the values of variables H, I, J, and L are stored between evaluations of the algorithms, to trade off a small amount of storage for a decreased computational load.

TABLE 1

XCB ENCRYPTION OPERATION

Given a key $K \in \{0, 1\}^k$, a plaintext $P \in \{0, 1\}^m$ where $m \in [w, 2^{39}]$, and associated data $Z \in \{0, 1\}^n$ where $n \in [0, 2^{39}]$, returns a ciphertext $C \in \{0, 1\}^m$.
  $H \leftarrow e(K, 0^w)$, $I \leftarrow e(K, 0^{w-1}\|1)$, $J \leftarrow e(K, 0^{w-2}\|10)$, $L \leftarrow e(K, 0^{w-2}\|11)$
  $A \leftarrow P[0; w-1]$
  $B \leftarrow P[w; len(P)-1]$
  $C \leftarrow e(K, A \oplus I)$
  $D \leftarrow C \oplus h(H, 0^w \| Z, B)$
  $E \leftarrow B \oplus c(K, D, len(D))$
  $F \leftarrow D \oplus h(H, Z\|L, E)$
  $G \leftarrow d(K, F) \oplus J$
  return G||E

TABLE 2

XCB DECRYPTION OPERATION

Given a key $K \in \{0, 1\}^k$, a ciphertext $C \in \{0, 1\}^m$ where $m \in [w, 2^{39}]$, and associated data $Z \in \{0, 1\}^n$ where $n \in [0, 2^{39}]$, returns a plaintext $P \in \{0, 1\}^m$.
  $H \leftarrow e(K, 0^w)$, $I \leftarrow e(K, 0^{w-1}\|1)$, $J \leftarrow e(K, 0^{w-2}\|10)$, $L \leftarrow e(K, 0^{w-2}\|11)$
  $G \leftarrow C[0; w-1]$
  $E \leftarrow C[w; len(C)-1]$
  $F \leftarrow e(K, G \oplus J)$
  $D \leftarrow F \oplus h(H, Z\|L, E)$
  $B \leftarrow E \oplus c(K, D, len(D))$
  $C \leftarrow D \oplus h(H, 0^w\|Z, B)$
  $A \leftarrow d(K, C) \oplus I$
  return A||B The two main functions used in the second embodiment are block cipher encryption and multiplication over the field $GF(2^{128})$. In the following algorithmic description, the block cipher encryption of the value X with the key K is denoted as e(K, X) and the block cipher decryption is denoted as d(K,X). The symbols E and D denote encryption and decryption according to the extended codebook mode of operation described herein.

The function $c: \{0, 1\}^k \times \{0, 1\}^w \rightarrow \{0, 1\}^l$, where the output length l is bounded by $0<=l<=2^{39}$, generates an arbitrary-length output by running the block cipher e in counter mode, using its w-bit input as the initial counter value. Its definition is:

$$C(K, W, l) = E(K, W) \| E(K, incr(W)) \| \ldots \| MSB_t(E(K, incr^{n-1}(W)),$$

wherein the output length l is made an explicit parameter for clarity. The expression n=⌈l/w⌉ is the number of w-bit blocks in the output, and t=l mod w is the number of bits in the trailing block. Further, the function incr: $\{0,1\}^w \to \{0,1\}^w$ is the increment operation that is used to generate successive counter values. The increment function treats the rightmost 32 bits of its argument as a non-negative integer with the least significant bit on the right, and increments this value modulo $2^{32}$.

The function h: $\{0,1\}^w \times \{0,1\}^m \times \{0,1\}^n \to \{0,1\}^w$, m∈[w, $2^{39}$], n∈[0, $2^{39}$], is defined by h(H, A, C)=$X_{m+n+1}$, where the variables $X_i \in \{0,1\}^w$, for I=0, ..., m+n+1 are defined as:

$$X_i = 0 \qquad \text{for } i = 0$$
$$(X_{i-1} \oplus A_i) \cdot H \qquad \text{for } i = 1, \ldots, m-1$$
$$(X_{m-1} \oplus (A_m^* \| 0^{w-v})) \cdot H \qquad \text{for } i = m$$
$$(X_{i-1} \oplus C_{i-m}) \cdot H \qquad \text{for } i = m+1, \ldots, m+n-1$$
$$(X_{m+n-1} \oplus (C_n^* \| 0^{w-u})) \cdot H \qquad \text{for } i = m+n$$
$$(X_{m+n} \oplus (len(A) \| len(C))) \cdot H \qquad \text{for } i = m+n+1.$$

In the foregoing expressions, $A_i$ denotes the w-bit substring A[(i−1)w; iw−1], and $C_i$ denotes C[(i−1)w; iw−i]. Thus, $A_i$ and $C_i$ are the $i^{th}$ blocks of A and C, respectively, if those bit strings are decomposed into w-bit blocks. A similar approach is provided in GHASH, the universal hash function that is used as a component of the Galois/Counter Mode (GCM) of Operation, except that GHASH requires w=128, as does AES.

Multiplication over the field GF($2^{128}$) is defined as an operation on bit vectors in order to simplify the specification herein. Such a definition precludes the need to use finite field mathematics in the definition of the approach. Background information on this field and its representation, and strategies for efficient implementation, are provided in the GCM specification in D. McGrew et al., "The Galois/Counter Mode of Operation (GCM)," *Submission to NIST Modes of Operation Process*, January 2004, sections 3 and 4 (available online in the directory CryptoToolkit/modes/proposed modes of domain csrc.nist.gov on the World Wide Web.

Each field element is a vector of 128 bits. The $i^{th}$ of an element X is denoted as $X_i$. The leftmost bit is $X_0$, and the rightmost bit is $X_{127}$. The multiplication operation uses the special element R=11100001∥$0^{120}$, and is defined in Table 3. The function rightshift( ) moves the bits of its argument one bit to the right. Thus, whenever W=rightshift(V), then $W_i = V_{i-1}$ for 1<=I<=127 and $W_0$=0.

TABLE 3

MULTIPLICATION FOR GF($2^{128}$)

```
Z ← 0, V ← X
for i = 0 to 127 do
    if Y_i = 1 then
        Z ← Z ⊕ V
    end if
    if V_127 = 0 then
        V ← rightshift(V)
    else
        V ← rightshift(V) ⊕ R
    end if
end for
return Z
```

3.3 Example Applications

Figure 3A:
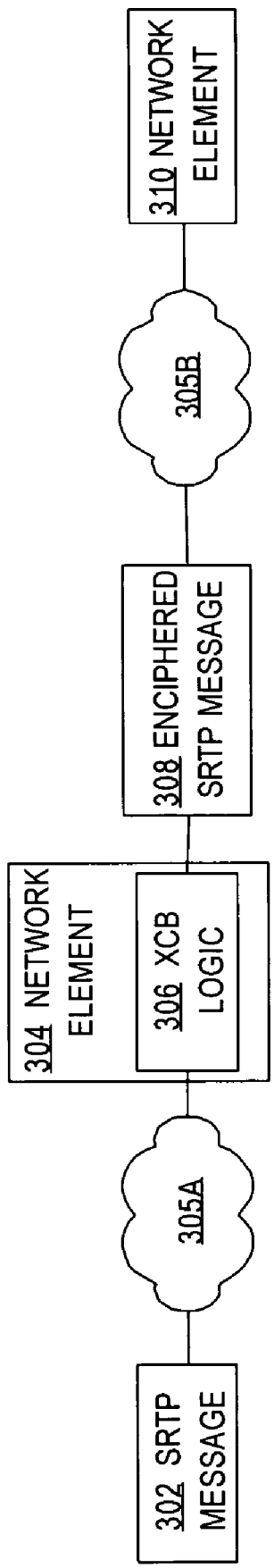
FIG. 3A is a block diagram showing a secure telecommunication system.
Figure 3B:
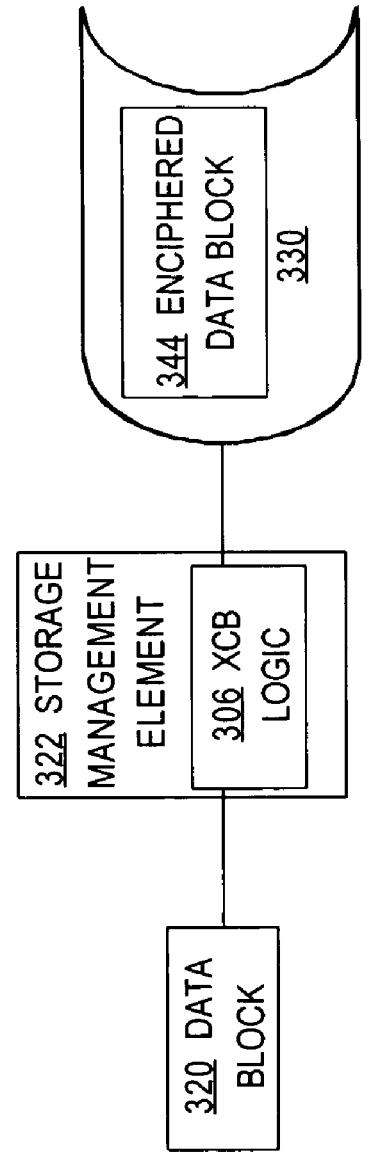
FIG. 3B is a block diagram showing a secure storage management system.

Example embodiments may be applied to several different applications. FIG. 3A is a block diagram showing a secure telecommunication system, and FIG. 3B is a block diagram showing a secure storage management system. Referring first to FIG. 3A, according to one embodiment, a network element 304 comprises XCB logic 306 that implements the approach of FIG. 1B, and the network element is coupled to a first network 305A and a second network 305B. A second network element 310 is also coupled to network 305B. Networks 305A, 305B may comprise the same network.

Network element 304 receives a secure real-time protocol (SRTP) message 302 from an upstream network element (not shown) through network 305A. Message 302 is considered a plaintext message. Network element 304 applies extended code block mode of operation, as described herein, to SRTP message 302 using XCB logic 306. The resulting ciphertext is packaged as enciphered SRTP message 308, which has the same length or size as the plaintext message. Network element 304 then forwards the enciphered message 308 to network element 310, which decrypts the message using the techniques herein or otherwise consumes the message. In this way, the techniques herein can be applied to any network communication scenario in which a particular messaging protocol cannot tolerate message expansion as a result of encryption.

Referring now to FIG. 3B, a storage management element 322 hosts or implements XCB logic 306. The storage management element 322 is coupled to a mass storage device 330, such as a disk array or disk drive.

Storage management element 322 receives, from the storage device 330, an operating system, central processor, or other processing element, a disk block 320 for storage in the storage device 330. Storage management element 322 applies extended code block mode of operation, as described herein, to the disk block 320 using XCB logic 306, to result in creating an enciphered disk block 324. The enciphered disk block 324 has a length or size that is the same as that of the disk block 320. Storage management element 322 then stores the enciphered disk block 324 in storage device 330.

In all such applications, each of the plaintext data, segments, intermediate result data, associated data, and ciphertext may comprise a digital value stored in an electronic digital memory device. Further, the separating, encrypting, hashing, XOR, and other operations described above may be performed in an electronic digital data processing apparatus coupled to the electronic digital memory device and interacting with the digital data values.

Particular applications may be implemented in the context of network communications using protocols such as secure RTP, and in storage management providing secure storage of disk blocks and the like. Thus, the approaches herein are applied within the technological arts.

The approaches herein also provide a useful, concrete and tangible result. In one embodiment, the approaches receive data values that may be represented in a computer as transitory electronic signals. In one embodiment, the approaches use an electronic digital data processor to manipulate the signals according to the data processing steps described herein. As a result, the input plaintext is changed to output ciphertext in a particular way. The output ciphertext is also represented as transitory electronic signals that may be stored in electronic digital devices, such as digital memory. Thus, the machine-implemented data manipulation steps described herein may operate on data stored in electronic computer memory; changing data causes a change in the state of cells, gates, and transistors of the electronic memory; changing the state of these devices means, at the atomic level, that an electron charge is applied to certain semiconductor materials associated with particular memory bit locations and not to others; and this change in charge is a concrete and tangible result.

3.4 Proof of Security

The approach herein can be proven to meet the goals identified above and to be secure. A proof of the security of the approach herein is set forth in the paper of McGrew et al., "Extended Codebook Mode (XCB): Security without Data Expansion" (Section 3, "Security"), reproduced in the Appendix, the entire contents of which are hereby incorporated by reference as if fully set forth herein.

3.5 Benefits of the Embodiments

The disclosed approach is unique in its efficiency, its ability to work with arbitrary plaintext lengths, and its ability to accept additional inputs. The approach provides a block cipher mode of operation that implements a nonmalleable cipher with an additional input. Viewed broadly, the approach herein makes three passes over the plaintext data to result in generating ciphertext. Two passes use universal hashing over $GF(2^{128})$, and one pass uses counter mode encryption. The approach herein relies in part on the invertibility of the block cipher for security, unlike all of the Luby-Rackoff and Naor-Reingold based designs.

The mode disclosed herein can be implemented in both hardware and software, and it has a computational cost that is relatively low compared to similar modes: it only requires n+1 block cipher invocations and 2n multiplications in $GF(2^w)$, where w is the number of bits in the block cipher inputs and outputs. The mode also has several useful properties: it accepts arbitrarily-sized plaintexts and associated data, including any plaintexts with lengths of at least w bits. This property allows the mode herein to protect short data, such as the common 20-byte G.729 voice codec in Secure RTP.

3.6 Certain Differences in View of Past Approaches

XCB is more efficient than any other nonmalleable cipher, in that it requires less computation. The next best mode of operation is the EME mode, which takes nearly twice the computation. Furthermore, XCB is more suitable for an efficient hardware implementation, because it can be more easily parallelized and pipelined. XCB also accepts an additional input, which can be used to prevent ciphertext-substitution attacks.

The approach herein is nearly twice as efficient as the best competitor. The approach herein also is provably secure under the reasonable assumption that AES is indistinguishable from a pseudorandom permutation.

The approach herein has many applications. For example, the approach can be used in Secure RTP, where it would be especially appropriate for wireless voice, or in CET, or in any other protocol in which expansion of a packet or data payload is infeasible or not permitted by the protocol.

The approach also can be used in storage networking or in data-storage systems in which expansion is infeasible. The approach can be used in disk block encryption for both local and remote storage.

4.0 Implementation Mechanisms—Hardware Overview

Figure 4:
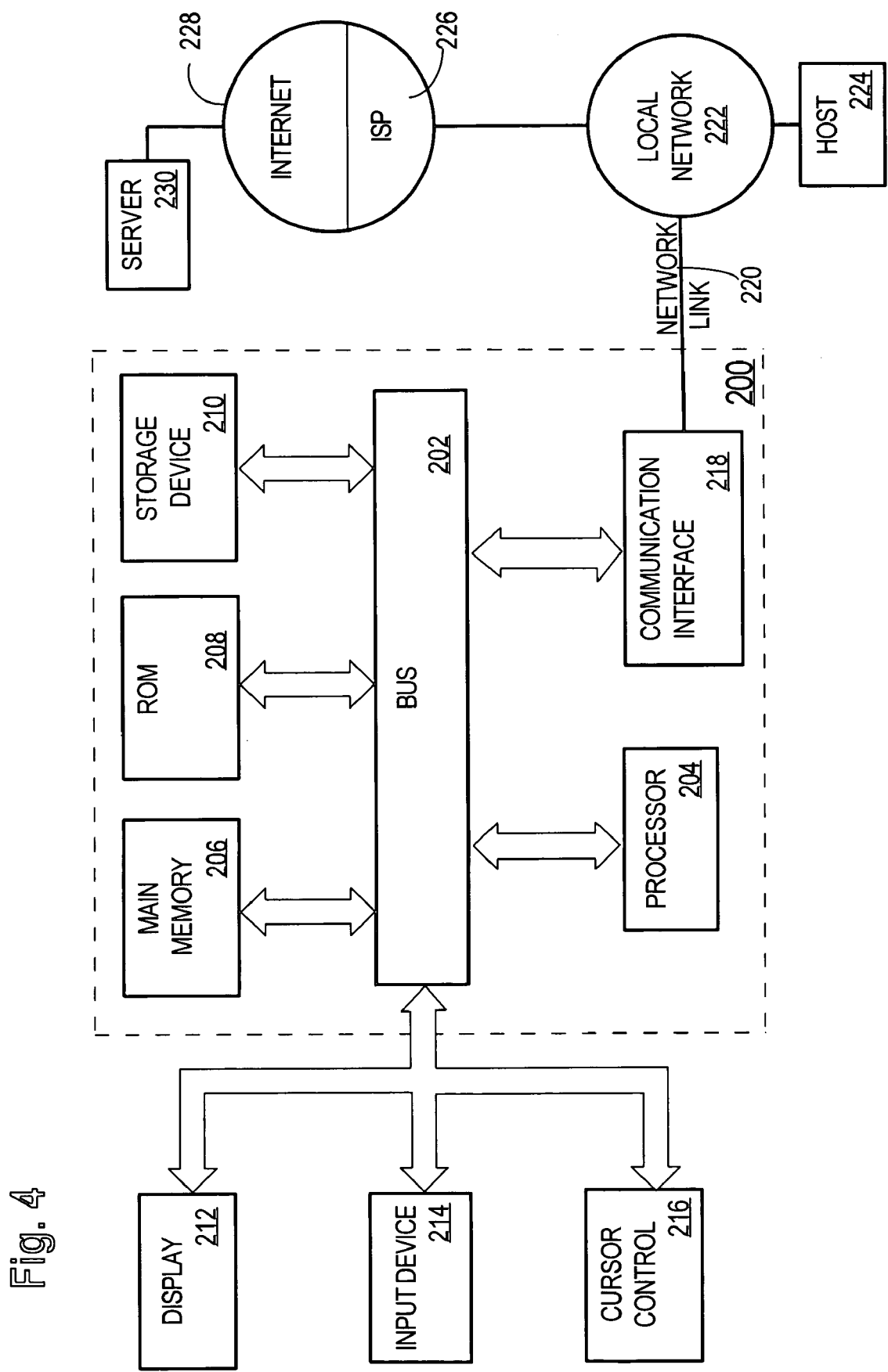
FIG. 4 is a block diagram that illustrates a computer system upon which an embodiment may be implemented.

FIG. 4 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory ("RAM") or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory ("ROM") 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube ("CRT"), for displaying information to a computer user. An input device 214, including alphanumeric and other keys, is coupled to bus 202 for communicating information and command selections to processor 204. Another type of user input device is cursor control 216, such as a mouse, trackball, stylus, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for an enciphering method. According to one embodiment of the invention, an enciphering method is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the- process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network ("ISDN") card or a modem to provide a data communication connection to a corresponding type of telephone line. As another example, communication interface 218 may be a local area network ("LAN") card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider ("ISP") 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for providing an enciphering method as described herein.

Processor 204 may execute the received code as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX

[Copy of McGrew et al. paper—16 pages]

The Extended Codebook (XCB) Mode of Operation
Version 3

David A. McGrew and Scott R. Fluhrer
Cisco Systems, Inc.
170 West Tasman Drive
San Jose, CA 95032
{mcgrew,sfluhrer}@cisco.com

Abstract

We describe a block cipher mode of operation that implements a 'tweakable' (super) pseudorandom permutation with an arbitrary block length. This mode can be used to provide the best possible security in systems that cannot allow data expansion, such as disk-block encryption and some network protocols. The mode accepts an additional input, which can be used to protect against attacks that manipulate the ciphertext by rearranging the ciphertext blocks.

Our mode is similar to a five-round Luby-Rackoff cipher in which the first and last rounds do not use the conventional Feistel structure, but instead use a single block cipher invocation. The third round is a Feistel structure using counter mode as a PRF. The second and fourth rounds are Feistel structures using a universal hash function; we re-use the polynomial hash over a binary field defined in the Galois/Counter Mode (GCM) of operation for block ciphers. This choice provides efficiency in both hardware and software and allows for re-use of implementation effort. XCB also has several useful properties: it accepts arbitrarily-sized plaintexts and associated data, including any plaintexts with lengths that are no smaller than the width of the block cipher.

This document is a pre-publication draft manuscript.

Contents

| | |
|---|---|
| 1 Introduction | 1 |
| 2 Specification | 2 |
|    2.1 Notation | 2 |
|    2.2 Definition | 3 |
|    2.3 Multiplication in $GF(2^{128})$ | 5 |
| 3 Security | 6 |
|    3.1 Algebraic Properties of h | 7 |
|    3.2 Adaptive Chosen Plaintext Attacks | 9 |
|    3.3 Collision Analysis | 9 |
|    3.4 End New Stuff | 10 |
| A Test Data | 14 |

1 Introduction

There are several scenarios in which *length-preserving, deterministic encryption* is useful. An encryption method is length-preserving if the ciphertext has exactly the same number of bits as does the plaintext. Such a method must be deterministic, since it is impossible to accommodate random data (such as an initialization vector) within the ciphertext. In some cases, deterministic length-preserving encryption exactly matches the requirements. For example, in some encrypted database applications, determinism is essential in order to ensure a direct correspondence between plaintext values being looked up and previously stored ciphertext values.

In some other cases, there is a length-preservation requirement that makes it impossible to provide all of the security services that are desired. Length-preserving algorithms cannot provide message authentication, since there is no room for a message authentication code, and they cannot meet strong definitions of confidentiality [2]. Essentially, these algorithms implement a codebook; repeated encryptions of the same plaintext value with the same key result it identical ciphertext values. An adversary gains knowledge about the plaintext by seeing which ciphertext values match, and which do not match. Despite these limitations, in many scenarios it may be desirable to use length-preserving encryption because other methods are unworkable. Length-preservation may allow encryption to be introduced into data processing systems that have already been implemented and deployed. Many network protocols have fixed-width fields, and many network systems have hard limits on the amount of data expansion that is possible. One important example is that of disk-block encryption, which is currently being addressed in the IEEE Security in Storage Working Group [5].

Given the limitation of length-preservation, the best security that we can provide is *non-malleable* encryption. Informally, a cipher is non-malleable if changing a single bit of a ciphertext value affects all of the bits of the corresponding plaintext. More formally, we require our cipher to be a *pseudorandom permutation*; it is indistinguishable from a permutation on the set of messages to a computationally bounded adversary. Because we want our cipher to handle plaintexts whose size may vary, we require the cipher to be a pseudorandom *arbitrary length* permutation: for each of the possible plaintext lengths, the cipher acts as a pseudorandom permutation. To provide as much flexibility as possible, we allow the plaintext lengths to vary even for a single fixed key.

In some cases, some additional data can be associated with the plaintext. By using this data as an input, we can provide better security, by letting each distinct associated data value 'index' a pseudorandom permutation. That is, we require the cipher to be a *pseudorandom arbitrary-length permutation with associated data*: for each plaintext length and each value of the associated data, the cipher acts as a pseudorandom permutation. For maximum flexibility, we allow the length of the associated data field to vary even for a single fixed key. In the disk block example, we can use the block number as the associated data value. This will prevent some attacks which rely on the codebook property, since identical plaintext values encrypted with distinct associated data values give unrelated ciphertext values.

The use of an associated data input to a pseudorandom permutation first appeared in the innovative Hasty Pudding Cipher of Schroppel [10], where it was called a 'spice', and was given a rigorous mathematical treatment by Liskov, Rivest, and Wagner [7], who called it a 'tweak'. Our security goal follows that of the latter work, with the distinction that we allow the associated data to have an arbitrary length.

The extended codebook (XCB) mode of operation for block ciphers implements a pseudorandom arbitrary-length permutation with associated data. XCB is defined so that it can use any block cipher, but we provide test data only for AES-128. This mode is amenable to implementation in both hardware and software, and it has a computational cost that is relatively low (compared to similar modes): it only requires $n + 1$ block cipher invocations and $2n$ multiplications in $GF(2^w)$, where $w$ is the number of bits in the block cipher inputs and outputs. The mode also has several useful properties: it accepts arbitrarily-sized plaintexts and associated data, including any plaintexts with lengths of at least $w$ bits. This property allows XCB to protect short data, like the common 20-byte G.729 voice codec in Secure RTP [1].

There are several other block cipher modes of operation that also implement psedurandom arbitrary-length permutations. Most notable is the EME mode of Halevi and Rogaway [4], which is also efficient and accepts associated data.

In the following, we define XCB (Section 2) and analyze its security (Section 3). Test data for XCB mode for the Advanced Encryption Standard with 128 bit keys (AES-128) [9] is provided in Appendix A.

2 Specification

This section contains the complete normative specification for XCB for use with 128-bit block ciphers. In order to use XCB with other block cipher widths, it is necessary to define a finite field of the appropriate size.

2.1 Notation

The two main functions used in XCB are block cipher encryption and multiplication over the field $GF(2^{128})$. The block cipher encryption of the value $X$ with the key $K$ is denoted as $e(K, X)$, and the block cipher decryption is denoted as $d(K, X)$. (Note that we reserve the symbols $E$ and $D$ to denote XCB encryption and decryption, respectively.) The number of bits in the inputs and outs of the block cipher is denoted as $w$. For the Advanced Encryption Standard (AES), $w = 128$. The multiplication of two elements $X, Y \in GF(2^{128})$ is denoted as $X \cdot Y$, and the addition of $X$ and $Y$ is denoted as $X \oplus Y$. Addition in this field is equivalent to the bitwise exclusive-or operation, and the multiplication operation is defined in Section 2.3.

The function $\text{len}(S)$ returns a 64-bit string containing the nonnegative integer describing the number of bits in its argument $S$, with the least significant bit on the right. The expression $0^l$ denotes a string of $l$ zero bits, and $A \| B$ denotes the concatenation of two bit strings $A$ and $B$. We consider bit strings to be indexed starting on the left, so that bit zero of $S$ is the leftmost bit. When $S$ is a bit string and $0 \leq a < b \leq \text{len}(S)$, we denote as $S[a; b]$ the length $b - a$ subtring of $S$ consisting of bits $a$ through $b$ of $S$. The symbol $\{\}$ denotes the bit string with zero length.

2.2 Definition

The XCB encryption and decryption operations are defined in Algorithms 1 and 2, respectively, and the encryption operation is illustrated in Figure 1. These algorithms use the block cipher encryption functions e and d, as well as the hash function h and the pseudorandom function c. The variables $H, I, J$ and $L$ are derived from $K$ by running the function e in counter mode, as shown in Figure 2. Optionally, these value could be stored between evaluations of these algorithms, in order to trade off some storage for a decreased computational load.

---

Algorithm 1 The XCB encryption operation. Given a key $K \in \{0,1\}^k$, a plaintext $P \in \{0,1\}^m$ where $m \in [w, 2^{39}]$, and associated data $Z \in \{0,1\}^n$ where $n \in [0, 2^{39}]$, returns a ciphertext $C \in \{0,1\}^m$.

---

$H \leftarrow \mathrm{e}(K, 0^w), I \leftarrow \mathrm{e}(K, 0^{w-1}\|1), J \leftarrow \mathrm{e}(K, 0^{w-2}\|10), L \leftarrow \mathrm{e}(K, 0^{w-2}\|11)$
$A \leftarrow \mathbf{P}[0; w-1]$
$B \leftarrow \mathbf{P}[w; \mathrm{len}(\mathbf{P}) - 1]$
$C \leftarrow \mathrm{e}(K, A \oplus I)$
$D \leftarrow C \oplus \mathrm{h}(H, 0^w\|\mathbf{Z}, B)$
$E \leftarrow B \oplus \mathrm{c}(K, D, \mathrm{len}(D))$
$F \leftarrow D \oplus \mathrm{h}(H, \mathbf{Z}\|L, E)$
$G \leftarrow \mathrm{d}(K, F) \oplus J$
return $G\|E$

---

Algorithm 2 The XCB decryption operation. Given a key $K \in \{0,1\}^k$, a ciphertext $C \in \{0,1\}^m$ where $m \in [w, 2^{39}]$, and associated data $Z \in \{0,1\}^n$ where $n \in [0, 2^{39}]$, returns a plaintext $P \in \{0,1\}^m$.

---

$H \leftarrow \mathrm{e}(K, 0^w), I \leftarrow \mathrm{e}(K, 0^{w-1}\|1), J \leftarrow \mathrm{e}(K, 0^{w-2}\|10), L \leftarrow \mathrm{e}(K, 0^{w-2}\|11)$
$G \leftarrow \mathbf{C}[0; w-1]$
$E \leftarrow \mathbf{C}[w; \mathrm{len}(\mathbf{C}) - 1]$
$F \leftarrow \mathrm{e}(K, G \oplus J)$
$D \leftarrow F \oplus \mathrm{h}(H, \mathbf{Z}\|L, E)$
$B \leftarrow E \oplus \mathrm{c}(K, D, \mathrm{len}(D))$
$C \leftarrow D \oplus \mathrm{h}(H, 0^w\|\mathbf{Z}, B)$
$A \leftarrow \mathrm{d}(K, C) \oplus I$
return $A\|B$

---

The function $\mathrm{c} : \{0,1\}^k \times \{0,1\}^w \to \{0,1\}^l$, where the output length $l$ is is bounded by $0 \le l \le 2^{39}$, generates an arbitrary-length output by running the block cipher e in counter mode, using its $w$-bit input as the initial counter value. Its definition is $$\mathrm{c}(K, W, l) = E(K, W) \| E(K, \mathrm{incr}(W)) \| \ldots \| \mathrm{MSB}_t(E(K, \mathrm{incr}^{n-1}(W)), \qquad (1)$$

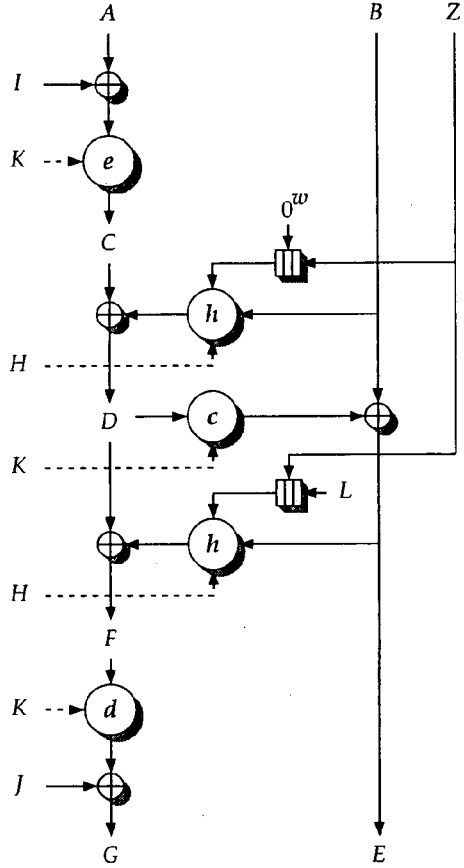

Figure 1: The XCB encryption operation. The secret variables $H, I$, and $J$ are derived from the secret key $K$.

where we make the output length $l$ an explicit parameter for clarity; $n = \lceil l/w \rceil$ is the number of $w$-bit blocks in the output and $t = l \bmod w$ is number of bits in the trailing block. Here the function incr : $\{0,1\}^w \to \{0,1\}^w$ is the increment operation that is used to generate successive counter values. This function treats the rightmost 32 bits of its argument as a nonnegative integer with the least significant bit on the right, increments this value modulo $2^{32}$. More formally, $$\text{incr}(X) = X[0; w - 33] \parallel (X[w - 32; w - 1] + 1 \bmod 2^{32}), \tag{2}$$

where we rely on the implicit conversion of bit strings to integers.

The function h : $\{0,1\}^w \times \{0,1\}^m \times \{0,1\}^n \to \{0,1\}^w, m \in [w, 2^{39}], n \in [0, 2^{39}]$ is defined by

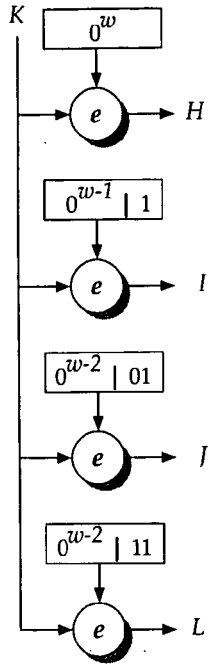

Figure 2: The initialization of the variables $H, I, J$ and $L$ from the key $K$.

$h(H, A, C) = X_{m+n+1}$, where the variables $X_i \in \{0,1\}^w$ for $i = 0, \ldots, m+n+1$ are defined as $$X_i = \begin{cases} 0 & \text{for } i = 0 \\ (X_{i-1} \oplus A_i) \cdot H & \text{for } i = 1, \ldots, m-1 \\ (X_{m-1} \oplus (A_m^* \| 0^{w-v})) \cdot H & \text{for } i = m \\ (X_{i-1} \oplus C_{i-m}) \cdot H & \text{for } i = m+1, \ldots, m+n-1 \\ (X_{m+n-1} \oplus (C_n^* \| 0^{w-u})) \cdot H & \text{for } i = m+n \\ (X_{m+n} \oplus (\text{len}(A) \| \text{len}(C))) \cdot H & \text{for } i = m+n+1. \end{cases} \quad (3)$$

Here we let $A_i$ denote the $w$-bit substring $A[(i-1)w; iw-1]$, and let $C_i$ denote $C[(i-1)w; iw-i]$. In other words, $A_i$ and $C_i$ are the $i^{th}$ blocks of $A$ and $C$, respectively, if those bit strings are decomposed into $w$-bit blocks. This function is identical to GHASH, the universal hash that is used as a component of the Galois/Counter Mode (GCM) of Operation [8], except that GHASH requires $w = 128$, as is the case for AES [9].

2.3 Multiplication in $GF(2^{128})$

The multiplication operation is defined as an operation on bit vectors in order to simplify the specification; it allows us to keep finite field mathematics out of the normative definition of the algorithm. Background information on this field and its representation, and strategies for efficient implementation, is provided in the GCM specification [8, Sections 3 and 4]. This definition of multiplication corresponds to the polynomial basis with the field polynomial of $f = 1 + \alpha + \alpha^2 + \alpha^7 + \alpha^{128}$.

Each field element is a vector of 128 bits. The $i^{th}$ bit of an element $X$ is denoted as $X_i$. The leftmost bit is $X_0$, and the rightmost bit is $X_{127}$. The multiplication operation uses the special element $R = 11100001\|0^{120}$, and is defined in Algorithm 3. The function rightshift() moves the bits of its

---

Algorithm 3 Multiplication in $GF(2^{128})$. Returns $Z = X \cdot Y$, where $X, Y, Z \in GF(2^{128})$.

$Z \leftarrow 0, V \leftarrow X$
for $i = 0$ to 127 do
   if $Y_i = 1$ then
      $Z \leftarrow Z \oplus V$
   end if
   if $V_{127} = 0$ then
      $V \leftarrow \text{rightshift}(V)$
   else
      $V \leftarrow \text{rightshift}(V) \oplus R$
   end if
end for
return $Z$

--- argument one bit to the right. More formally, whenever $W = \text{rightshift}(V)$, then $W_i = V_{i-1}$ for $1 \leq i \leq 127$ and $W_0 = 0$.

3 Security

END OF WELL-EDITED SECTION - DON'T READ FURTHER

We provide a proof sketch for the security of XCB in the concrete security model introduced by Bellare et. al. [3]. We can show that XCB is a secure pseudorandom arbitrary-length permutation with associated data (ALPA), using only the assumption that e is a secure $w$-bit pseudorandom permutation, as follows. We start by showing that a pseudorandom arbitrary-length function with associated data (ALFA) is nearly indistinguishable from an arbitrary-length PRP with associated data, as long as the number of invocations of the function is bounded. We then show that XCB is nearly indistinguishable from a pseudorandom ALFA, as long as the number of queries to the oracle representing e is bounded. Tying these two facts together shows that XCB is a pseudorandom ALPA when these bounds are respected. The number of invocations of the XCB encrypt and decrypt functions is less than the number of block cipher encryptions and decryptions used during those invocations. This fact ensures that the security degradation due to our viewing XCB as a PRF is small.

We next sketch how to show that XCB is a secure pseudorandom ALFA against either adaptive chosen plaintext attacks or adaptive chosen ciphertext attacks. (We defer consideration of attacks in which an adversary is allowed to adaptively choose *both* plaintexts and ciphertexts until later.)

The basic idea behind this proof is that the ciphertext value $(d(K,F) \oplus J) \| (B \oplus c(K,D))$ returned from an encryption query is indistinguishable from random as long as the values of the variables $D$ and $F$ do not repeat across different invocations of that function, and the functions c and e are indistinguishable from random. Similarly, the plaintext values $(e(K,C) \oplus I) \| (E \oplus c(K,D))$ returned from a decryption query are indistinguishable from random as long as the values of $D$ and $C$ do not repeat. The proof that counter mode is secure is standard [2], as is the effectiveness of a block cipher as a pseudorandom function. The probable uniqueness of the variables $C$, $D$ and $F$ across all invocations follows from the properties of the function h, which is $\epsilon$-almost xor universal [6]. A detailed treatment requires consideration of the probability that no collision on those variables occurs on the $i^{th}$ query, given that no collision occurred on any of the previous $i-1$ queries.

Security against attacks in which the adversary can adaptively choose both ciphertexts and plaintexts can be proven using a method similar to that outlined above. We give the adversary access to ALFA encryption and decryption oracles, and allow her $q$ queries in total. We assume without loss of generality that the adversary never repeats a query, and never asks for the decryption of a ciphertext value returned by a previous encryption query, and never asks for the encryption of a plaintext value returned by a previous decryption query.

As above, we rely on the absence of collisions for the variables $C$, $D$, and $F$, but in this case we need to more carefully define what a collision means. More precisely, we can show that, if an event $\Gamma$ occurs, then XCB cannot be effectively distinguished from a random ALFA. This event is defined as the conjunction $\Gamma = \Gamma_0 \cap \Gamma_1 \cap \Gamma_2 \cap \Gamma_3$ of the events defined as follows:

$\Gamma_0$ is the event that both $D_i \neq D_j$ and $F_i \neq F_j$ for each pair of distinct encryption queries $(i,j)$.

$\Gamma_1$ is the event that both $D_i \neq D_j$ and $C_i \neq C_i$ for each pair of distinct decryption queries $(i,j)$.

$\Gamma_2$ is the event that both $D_i \neq D_j$ and $F_i \neq F_j$ for each pair $(i,j)$ of queries consisting of an encryption query $i$ and a decryption query $j$, where $j < i$.

$\Gamma_3$ is the event that both $D_i \neq D_j$ and $C_i \neq C_j$ for each pair $(i,j)$ of queries consisting of an encryption query $i$ and a decryption query $j$, where $j > i$.

Events $\Gamma_1$ and $\Gamma_2$ correspond to security against chosen plaintext and chosen ciphertext attacks, respectively. Event $\Gamma_3$ takes into account that an adversary can attempt to force an encryption query to cause a collision on $D$ or $F$ with a previous decryption query. Event $\Gamma_4$ takes into account that an adversary can attempt to force a decryption query to cause a collision on $C$ or $D$ with a previous encryption query. Of course, an adversary can easily cause a collision on the $C$-values with two encryption queries that use the same $A$-values, but this fact is irrelevant because it does not lead to a method of distinguishing XCB from a random ALFA. Similarly, collisions on $F$-values from two decryption queries are possible but irrelevant.

3.1 Algebraic Properties of h

The function h has the property that it is linear in terms of its arguments.

Theorem 1 (h is linear). *For any $H \in V^w$ and any $A, A', C$ and $C'$ such that $len(A) = len(A')$ and $len(C) = len(C')$,*

$$h(H, A, C) \oplus h(H, A', C') = h(H, A \oplus A', C \oplus C'). \tag{4}$$

*Proof.* Consider the evaluation of $h(H, A, C)$ and $h(H, A', C')$, where $len(B) = len(B')$. Let $X_i$ be as defined in equation 2, and let $X'_i$ be defined similarly, but with $X'_i, A'_i$, and $C'_i$ replacing $X_i, A_i$, and $C_i$, respectively. Then define $\delta X_i$ to be $X_i \oplus X'_i$. Note that $$\delta X_i = \begin{cases} 0 & \text{for } i = 0 \\ (\delta X_{i-1} \oplus \delta A_i) \cdot H & \text{for } i = 1, \ldots, m-1 \\ (\delta X_{m-1} \oplus (\delta A_m^* \| 0^{w-v})) \cdot H & \text{for } i = m \\ (\delta X_{i-1} \oplus \delta C_{i-m}) \cdot H & \text{for } i = m+1, \ldots, m+n-1 \\ (\delta X_{m+n-1} \oplus (\delta C_n^* \| 0^{w-u})) \cdot H & \text{for } i = m+n \\ (\delta X_{m+n} \oplus (len(A) \| len(C))) \cdot H & \text{for } i = m+n+1. \end{cases} \tag{5}$$

Thus $h(H, A, C) \oplus h(H, A', C') = h(H, A \oplus A', C \oplus C')$. □

A simple relationship between $F$ and $C$ follows from this lemma:

$$\begin{aligned} F &= D \oplus h(H, Z\|0^w, B) \\ &= C \oplus h(H, Z\|0^w, B) \oplus h(H, 0^w\|Z, B) \\ &= C \oplus h(H, (Z\|0^w) \oplus (0^w\|Z), c(K, D)) \end{aligned} \tag{6}$$

where $$D = e(K, A \oplus I) \oplus h(H, 0^w\|Z, B). \tag{7}$$

A similar relation holds for decryption:

$$\begin{aligned} C &= D \oplus h(H, 0^w\|Z, E) \\ &= F \oplus h(H, 0^w\|Z, B) \oplus h(H, Z\|0^w, E) \\ &= F \oplus h(H, (0^w\|Z) \oplus (Z\|0^w), c(K, D)), \end{aligned} \tag{8}$$

where $$D = d(K, G \oplus J) \oplus h(H, Z\|0^w, E). \tag{9}$$

If the $0^w$ terms had not been concatenated with Z, then the first argument to h in this relation would have been $0^{len(Z)}$. The presence of these terms preserves security even when the term $c(K, D)$ is as small as zero bits (recall that its length is equal to $len(B)$), by causing $F$ to be dependent on Z. This dependance is important because, for different invocations of the encryption function, values of $F$ need to be distinct even when $len(B) = 0$ and the values of $A$ are identical. The dependance holds because the value $V(Z) = (0^w\|Z) \oplus (Z\|0^w)$ is an invertible transformation of Z, since it is easy to compute Z given $V(Z)$ by considering successive $w$-bit blocks of $V$. Thus, for any two distinct values Z and Z', the value of $V(Z)$ and $V(Z')$ will be distinct.

3.2 Adaptive Chosen Plaintext Attacks

In this section, we show that XCB is secure against adaptive chosen plaintext attacks, by showing that XCB is an ALFA. We defer consideration of attacks in which an adversary is allowed to adaptively choose both plaintexts and ciphertexts until the next section.

The basic idea behind this proof is that the ciphertext values $(\mathrm{d}(K,F) \oplus J) \| (B \oplus \mathrm{c}(K,D))$ returned from an encryption query are indistinguishable from random as long as the values of the variables $D$ and $F$ do not repeat across different invocations of that function, and the functions c and e are indistinguishable from random. Similarly, the plaintext values $(\mathrm{e}(K,C) \oplus I) \| (E \oplus \mathrm{c}(K,D))$ returned from a decryption query are indistinguishable from random as long as the values of $D$ and $C$ do not repeat.

In order that the ciphertext $(G, E)$ be indistinguishable from random, it is sufficient that e and c be random and that the values $F$ and $D$ be distinct for each evaluation of the function for each fixed key. The latter requirement ensures that the inputs to e and c are distinct, so that the ciphertexts are formed from distinct invocations of pseudorandom values. Consider the case in which there are $q$ distinct invocations for a fixed key. We label the internal variables as $\{A_i, B_i, C_i, D_i, E_i, F_i, G_i\}$ for the $i^{th}$ invocation. We assume that the adversary has access to an encryption oracle; that is, can feed chosen plaintext to the receiver and capture the resulting ciphertext.

In the $i^{th}$ invocation of the encryption operation, the variables $D_i$ and $F_i$ are the inputs to the pseudorandom functions. If these values are distinct for all values of $i \neq j$, then the outputs of the functions e and c are distinct, thus preserving their pseudorandomness.

3.3 Collision Analysis

Before we develop the formal security model needed for our theorems, we first analyze the set of events that can lead to failure.

We consider the following events:

$\Omega_1$ is the event that $D_i = D_j$ and $i$ and $j$ are both encryptions, $\Omega_2$ is the event that $D_i = D_j$ and $i$ and $j$ are both decryptions, $\Omega_3$ is the event that $D_i = D_j$ and $i$ is an encryption and $j$ is a decryption, $\Omega_4$ is the event that $D_i = D_j$ and $i$ is a decryption and $j$ is an encryption, $\Omega_5$ is the event that $F_i = F_j$ and $i$ and $j$ are both encryptions, $\Omega_6$ is the event that $F_i = F_j$ and $i$ and $j$ are both decryptions, $\Omega_7$ is the event that $F_i = F_j$ and $i$ is an encryption and $j$ is a decryption, $\Omega_8$ is the event that $F_i = F_j$ and $i$ is a decryption and $j$ is an encryption.

When $\Omega_1$ occurs, then $$h(H, 0^w \| Z_i, B_i) \oplus h(H, 0^w \| Z_j, B_j) \oplus e(K, A_i \oplus I) \oplus e(K, A_j \oplus I). \qquad (10)$$

For each invocation of the encrypt function, the three-tuple $(A, B, Z)$ must be distinct. Thus, either $Z_i \neq Z_j$ or $B_i \neq B_j$, or $Z_i = Z_j$, $B_i = B_j$, and $A_i \neq A_j$. In the first case, the properties of $h$ ensure that the event is unlikely. In the second case, the pseudorandomness of $e$ ensures that it is unlikely.

The event $\Omega_2$ is essentially the same as $\Omega_1$, after a relabeling of variables.

When $\Omega_3$ occurs, then $$e(K, A_i \oplus I) \oplus d(K, G_j \oplus J) = h(H, 0^w \| Z_i, B_i) \oplus h(H, Z_j \| 0^w, B_j). \qquad (11)$$

Note that an adversary can choose $Z_i$ and $Z_j$ such that $Z_j \| 0^w = 0^w \| Z_i$.

We consider three subcases: 1) $G_i = G_j$ and $E_i \neq E_j$, 2) $G_i \neq G_j$ and $E_i \neq E_j$, and 3) $G_i \neq G_j$ and $e_i \neq E_j$. In case 1, $F_i = F_j$, so that $D_j = F_i \oplus h(H, Z, B)$. NEED MORE HERE

When $\Omega_5$ occurs, then $$C_i \oplus C_j = h(H, (Z_i \| 0^w) \oplus (Z_i \| 0^w), c(K, D_i)) \oplus h(H, (Z_j \| 0^w) \oplus (Z_j \| 0^w), c(K, D_j)). \qquad (12)$$

The event $\Omega_6$ is similar.

When $\Omega_7$ occurs, then $$C_i \oplus d(K, G_j \oplus J) = h(H, (Z_i \| 0^w) \oplus (Z_i \| 0^w), c(K, D_i)) \qquad (13)$$

The event $\Omega_8$ is similar.

3.4 End New Stuff

We denote the event that $D_i \neq D_j$ and $F_i \neq F_j$ for all $i \neq j$ as $\Omega$. If this event happens, then the function is indistinguishable from random. We compute the probability that $\Omega$ does *not* happen, and show that this probability can be made acceptably small. The probability that $D_i = D_j$ is the same as the probability that $D_i \oplus D_j = e(K, A_i \oplus I) \oplus e(K, A_j \oplus I) \oplus h(H, B_i) \oplus h(H, B_j) = 0$.

A function $g : \{0,1\}^k \times \{0,1\}^m \to \{0,1\}^t$ is $\epsilon$-*almost xor universal* if $$P[g(K, M) \oplus g(K, M') = a \mid K \xleftarrow{R} \{0,1\}^k] \leq \epsilon \text{ for all } M \neq M' \in \{0,1\}^m \text{ and } a. \qquad (14)$$

Here the expression $P[E \mid F]$ denotes the probability of the event $E$ given that the event $F$ has occurred, and the expression $K \xleftarrow{R} GF(2^{128})$ means that $K$ is chosen at random from the set $\{0,1\}^k$. We diverge slightly from the usual definition in order to allow our exposition to be more explicit[1].

---

[1] In the standard definition, $g$ would define a hash function family, and the selection of a key $K$ would choose a particular hash function from that family of functions.

Lemma 2 (h is $\epsilon$-AXU). *The function* h *defined by Equation 2 is $\epsilon$-almost xor universal with* $\epsilon = \lceil l/w + 1 \rceil 2^{128}$ *whenever its inputs are restricted to $l$ or fewer bits.*

During the evaluation of an XCB operation, the function c uses the values $D$, $\text{incr}(D)$, $\text{incr}^2(D), \ldots, \text{incr}^{b-1}(D)$ as input to the function e. Here we denote as $c_i$ the number of counters used in the $i^{th}$ query. We call these values the *counter sequence* for the $i^{th}$ query. The pseudorandomness of the function c depends on the distinctness of these counter queries. We denote as $\Omega_i(D)$ the event that the $i^{th}$ counter sequence is distinct from the counter sequences of the previous $i-1$ queries. Similarly, we denote the event that $F_i \neq F_j$ for all $1 \leq j < i$ as $\Omega_i(F)$. We define the event $\Omega_i$ as the conjunction $\Omega_i(D) \cap \Omega_i(F)$. When this event occurs, then during the $i^{th}$ query, the variables $D$ and $F$ take on values that are distinct from the values that they took during the previous queries.

We consider the $i^{th}$ query, assuming that no collisions occurred during any of the previous queries. When comparing this query with the $j^{th}$ query, there are two cases:

1. When $B_i = B_j$, then $A_i \neq A_j$, because the inputs must be distinct. However, $\text{e}(K_0, A_i) \neq \text{e}(K_0, A_j)$ because a permutation is uniquely invertible; thus $D_i \neq D_j$.

2. When $B_i \neq B_j$, then $$P[D_i = D_j] = P[\text{h}(K_1, B_i) \oplus \text{h}(K_1, B_j) = \text{e}(K_0, A_i) \oplus \text{e}(K_0, A_j)] \leq \epsilon. \tag{15}$$

Thus, the probability that $D_i = D_j$ for each of the $i-1$ values of $j$, given that $\Omega_{i-1} \cap \Omega_{i-2} \cap \ldots \cap \Omega_1$ has occurred, is no greater than $\epsilon$. It follws that the probability of $\Omega_i(D)$, given that $\Omega_{i-1} \cap \Omega_{i-2} \cap \ldots \cap \Omega_1$ has occurred is no less than $1 - (i-1)\epsilon$. We next assume that both of those events have occurred, and consider the probability that $F_i = F_l$ for some value of $l$ between 1 and $i-1$. There are two cases:

1. When $E_i = E_l$, then $F_i \neq F_l$ because the uniqueness of the $F$-values follows from the uniqueness of the $D$-values in this case.

2. When $E_i \neq E_l$, then $$P[F_i = F_l] = P[\text{h}(K_3, E_i) \oplus \text{h}(K_3, E_l)) = D_i \oplus D_l] \leq \epsilon.$$

This equation holds in both cases. Thus, the probability of $\Omega_i(F)$, given that the events $\Omega_{i-1} \cap \Omega_{i-2} \cap \ldots \cap \Omega_1$ and $\Omega_i(D)$ have occurred, is no less than $1 - (i-1)\epsilon$. Therefore, $$P[\Omega_i \mid \Omega_{i-1} \cap \Omega_{i-2} \cap \ldots \cap \Omega_1] \geq (1 - (i-1)\epsilon)^2 \tag{16}$$

When $\Omega_i^c(D)$ occurs, then the $i^{th}$ counter sequence overlaps with a previous sequence. In order for a sequence of length $c$ to overlap with a previous sequence, then either the initial counter of the sequence is contained in the previous sequence, or the initial counter is contained in one of the $c$ counters that precede the previous sequence. If the counter sequences for queries $r$ and $s$ overlap, then $D_r = \text{incr}^t(D_s)$ for some value of $t$ such that $-c_r < t < c_s$. When this condition holds, then $$\text{h}(K_1, B_r, Z_r) = C_r \oplus \text{incr}^t(C_s \oplus \text{h}(K_1, B_s, Z_s)). \tag{17}$$

When $B_e^c$ and $\Omega_{i-1}$ occurs, then the probability that this happens is no more than . . .

Theorem 3. *The probability* $P[\Omega_1 \cap \Omega_2 \ldots \cap \Omega_q]$ *is at least ...*

*Proof.* For any set of events $A_1, A_2, \ldots, A_n$ such that $P[A_1 \cap A_2 \cap \ldots \cap A_n] > 0$, $$P[A_1 \cap A_2 \cap \ldots \cap A_n] = P[A_n \mid A_1 \cap A_2 \cap \ldots \cap A_{n-1}] \times$$
$$P[A_{n-1} \mid A_1 \cap \ldots \cap A_{n-2}] \times P[A_{n-2} \mid A_1 \cap \ldots \cap A_{n-3}] \times \cdots \times P[A_1].$$

The probability $P[\Omega_1 \cap \Omega_2 \ldots \cap \Omega_q]$ is thus no less than $$\prod_{i=1,}^{q}(1-(i-1)\epsilon)^2 \geq (1-q\epsilon)^{2q} \geq 1 - 2\epsilon q^2. \tag{18}$$

□

Theorem 4. *An adversary that can distinguish XCB from an ALFA with advantage $A_{XCB}$ can distinguish the block cipher e from a w-bit random function of at least $A_e$.*

*Proof.* We build an e-distinguisher out of an XCB distinguisher by implementing XCB by replacing each invocation of e and its inverse by a call to the block cipher oracle, running the XCB distinguisher against that XCB implementation. If the XCB-distinguisher indicates that it believes that the inputs were created by XCB (that is, the event $D_{XCB}$ occurs), then our $E$-distinguisher indicates that the block cipher oracle is $E$ (that is, the event $D_e$ occurs).

Our analysis uses the following facts.

Fact 1. $P[D_e \mid B_e] = P[D_{XCB} \mid B_{XCB}]$, because the events $B_e$ and $B_{XCB}$ both provide equivalent inputs to the distinguisher, and the distinguishers are identical.

Fact 2. For any three events $A, B$ and $C$ (with $P[B] \neq 0$), $$\begin{aligned}
P[A \mid B] &= \frac{P[A \cap B]}{P[B]} \\
&= \frac{P[A \cap B \cap C]}{P[B]} + \frac{P[A \cap B \cap C^c]}{P[B]} \\
&= \frac{P[A \cap B \cap C]}{P[B \cap C]} \frac{P[B \cap C]}{P[B]} + \frac{P[A \cap B \cap C^c]}{P[B \cap C^c]} \frac{P[B \cap C^c]}{P[B]} \\
&= P[A \mid B \cap C]P[C \mid B] + P[A \mid B \cap C^c]P[C^c \mid B]. \tag{19}
\end{aligned}$$

Fact 3. The events $B_e^c \cap \Omega$ and $B_{XCB}^c$ are identical.

The advantage with which our distinguisher works against e is $$A_e = P[D_e \mid B_E] - P[D_e \mid B_e^c]$$
$$= P[D_{XCB} \mid B_{XCB}] - P[D_e \mid B_e^c] \text{ using Fact 1}$$
$$= P[D_{XCB} \mid B_{XCB}] - P[D_e \mid B_e^c \cap \Omega]P[\Omega \mid B_e^c] - P[D_e \mid B_e^c \cap \Omega^c]P[\Omega^c \mid B_e^c] \text{ using Fact 2}$$
$$\geq P[D_{XCB} \mid B_{XCB}] - P[D_{XCB} \mid B_{XCB}^c] - P[D_e \mid B_e^c \cap \Omega^c]P[\Omega^c \mid B_e^c] \text{ using Fact 3}$$
$$= A_{XCB} - P[D_e \mid B_e^c \cap \Omega^c]P[\Omega^c \mid B_e^c]$$
$$\geq A_{XCB} - P[\Omega^c \mid B_e^c]$$
$$\geq A_{XCB} - ???. \tag{20}$$

□

References

[1] M. Baugher, D. McGrew, M. Naslund, E. Carrara, K. Norrman. "The Secure Real-time Transport Protocol," *IETF RFC 3711*, March 2004.

[2] M. Bellare, A. Desai, E. Jokipii, and P. Rogaway. "A concrete security treatment of symmetric encryption," In *Proceedings of the 38th FOCS*, IEEE Computer Society Press, 1997.

[3] M. Bellare, J. Kilian, P. Rogaway, "The Security of the Cipher Block Chaining Message Authentication Code," *J. Comput. Syst. Sci.* 61(3). pg. 362-399 (2000).

[4] S. Halevi and P. Rogaway, A Parallelizable Enciphering Mode, *2004 RSA Conference Cryptography Track*, LNCS, Springer-Verlag, 2004.

[5] IEEE Security in Storage Working Group, Web page. http://siswg.org.

[6] H. Krawczyk, "LFSR-based hashing and authentication," In Y. Desmedt, editor, *CRYPTO '94*, LNCS, Springer-Verlag, Aug. 1994.

[7] M. Liskov, R. Rivest and D. Wagner. Tweakable Block Ciphers. *CRYPTO '02*, LNCS, Springer-Verlag, 2002.

[8] D. McGrew and J. Viega, "The Galois/Counter Mode of Operation (GCM)," *Submission to NIST Modes of Operation Process*, January, 2004. Available online at http://csrc.nist.gov/CryptoToolkit/modes/proposedmodes.

[9] U.S. National Institute of Standards and Technology. The Advanced Encryption Standard. *Federal Information Processing Standard* (FIPS) 197, 2002.

[10] R. Schroeppel, *Hasty Pudding Cipher Specification*, First AES Candidate Workshop, August, 1998. Available online at http://www.cs.arizona.edu/people/rcs/hpc/hpc-spec.

A  Test Data

In this section we provide detailed test data for AES-128 XCB. The variables are as defined in Algorithms 1 and 2. All values are in hexadecimal, and values that are larger than 128 bits in length are continued on the following lines.

| Variable | Value |
|---------:|-------|
| $K$ | 000102030405060708090a0b0c0d0e0f |
| $Z$ | 00000000000000000000000000000001 |
| $P$ | 00000000000000000000000000000000 |
|     | 00000000000000000000000000000000 |
| $C$ | d0c3a39133dbc338a5bd4f1ecda0b6df |
|     | fd50ce104f296faadaefe82635e1b099 |
| $H$ | c6a13b37878f5b826f4f8162a1c8d879 |
| $I$ | 7346139595c0b41e497bbde365f42d0a |
| $J$ | 49d68753999ba68ce3897a686081b09d |
| $L$ | b9ad2b2e346ac238505d365e9cb7fc56 |
| $A$ | 00000000000000000000000000000000 |
| $B$ | 00000000000000000000000000000000 |
| $C$ | 11672daf341fe5bf4ec484b1f6025928 |
| $D$ | ba72f97b39fb8535bc913bf943b3709b |
| $E$ | 91abdd5c4da3541ad8248b2e68c04cfa |
| $F$ | fd50ce104f296faadaefe82635e1b099 |
| $G$ | d0c3a39133dbc338a5bd4f1ecda0b6df |

What is claimed is:

1. A data communication method, comprising the computer-implemented steps of:
   receiving, over an electronic digital telecommunication link that couples a sender and receiver to one another, a first message comprising input plaintext data;
   separating the plaintext data into a first plaintext data segment and a second plaintext data segment;
   encrypting the first plaintext data segment using block cipher encryption and a first key, resulting in creating a first encrypted segment;
   applying an exclusive OR operation to the first encrypted segment and a hash of the second plaintext data segment and an associated data element based on a second key, resulting in creating a first intermediate result datum;
   applying an encryption operation to the first intermediate result datum and a third key, resulting in creating an encryption output;
   applying an exclusive OR operation to the encryption output and the second plaintext data segment, resulting in creating a second intermediate result datum;
   applying an exclusive OR operation to the first intermediate result datum and a hash of the second intermediate result and the associated data element using a fourth key, resulting in creating a third intermediate result datum; and
   creating, as an output ciphertext, a concatenation of the second intermediate result datum and a decryption of third intermediate result datum using a fifth key;
   sending the output ciphertext to the receiver over the link in a second message;
   wherein each of the plaintext data, segments, intermediate result data, associated data, and ciphertext is a digital value stored in an electronic digital memory device;
   wherein the separating, encrypting, applying, and creating operations are performed in an electronic digital data processing apparatus coupled to the electronic digital memory device and interacting with the digital data values.

2. A method, comprising the computer-implemented steps of:
   receiving plaintext data;
   separating the plaintext data into a first plaintext data segment A and a second plaintext data segment B;
   encrypting the first plaintext data segment A using block cipher encryption and a first key, resulting in creating a first encrypted segment C;
   applying an exclusive OR operation to the first encrypted segment C and a hash of the second plaintext data segment B and an associated data element Z based on a second key, resulting in creating a first intermediate result datum D;
   applying an encryption operation to the first intermediate result datum D and a third key, resulting in creating an encryption output;
   applying an exclusive OR operation to the encryption output and the second plaintext data segment B, resulting in creating a second intermediate result datum E;
   applying an exclusive OR operation to the first intermediate result datum D and a hash of the second intermediate result and the associated data element Z using a fourth key, resulting in creating a third intermediate result datum F; and
   creating, as an output ciphertext, a concatenation of the second intermediate result datum E and a decryption of third intermediate result datum F using a fifth key.

3. A method as recited in claim 2, wherein the second key, third key, fourth key, and fifth key are determined based on the first key and a key derivation process.

4. A method as recited in claim 2, comprising deciphering the ciphertext by performing the steps of claim 2 in inverse order.

5. A method as recited in claim 2, wherein the plaintext comprises a block of data for storage in a non-volatile memory, and further comprising storing the ciphertext in the non-volatile memory.

6. A method as recited in claim 2, wherein the plaintext comprises a block of data for storage in a disk drive device, and further comprising storing the ciphertext in the disk drive device.

7. A method as recited in claim 2, wherein the plaintext comprises a data payload of a packet that conforms to a non-expandable data protocol, and further comprising storing the ciphertext in the packet.

8. A method as recited in claim 2, wherein the plaintext comprises a data payload of a packet that conforms to Secure RTP, and further comprising storing the ciphertext in the packet.

9. A method as recited in claim 2, wherein the encryption operation is AES counter-mode encryption.

10. A method as recited in claim 2, wherein the encryption operation is AES OSB block cipher mode.

11. An apparatus, comprising:
    one or more processors;
    means for receiving plaintext data;
    means for separating the plaintext data into a first plaintext data segment and a second plaintext data segment;
    means for encrypting the first plaintext data segment using block cipher encryption and a first key, resulting in creating a first encrypted segment;
    means for applying an exclusive OR operation to the first encrypted segment and a hash of the second plaintext data segment and an associated data element based on a second key, resulting in creating a first intermediate result datum;
    means for applying counter-mode encryption to the first intermediate result datum and a third key, resulting in creating a counter-mode output;
    means for applying an exclusive OR operation to the counter-mode output and the second plaintext data segment, resulting in creating a second intermediate result datum;
    means for applying an exclusive OR operation to the first intermediate result datum and a hash of the second intermediate result and the associated data element using a fourth key, resulting in creating a third intermediate result datum; and
    means for creating as an output ciphertext, a concatenation of the second intermediate result datum and a decryption of third intermediate result datum using a fifth key.

12. An apparatus as recited in claim 11, wherein the second key, third key, fourth key, and fifth key are determined based on the first key and a key derivation process.

13. An apparatus as recited in claim 11, comprising deciphering the ciphertext by performing the steps of claim 11 in inverse order.

14. An apparatus as recited in claim 11, wherein the plaintext comprises a block of data for storage in a non-volatile memory, and further comprising storing the ciphertext in the non-volatile memory.

15. An apparatus as recited in claim 11, wherein the plaintext comprises a block of data for storage in a disk drive device, and further comprising storing the ciphertext in the disk drive device.

16. An apparatus as recited in claim 11, wherein the plaintext comprises a data payload of a packet that conforms to a non-expandable data protocol, and further comprising storing the ciphertext in the packet.

17. An apparatus as recited in claim 11, wherein the plaintext comprises a data payload of a packet that conforms to Secure RTP, and further comprising storing the ciphertext in the packet.

18. An apparatus as recited in claim 11, wherein the encryption operation is AES counter-mode encryption.

19. An apparatus as recited in claim 11, wherein the encryption operation is AES OSB block cipher mode.

20. An enciphering apparatus, comprising:
a network interface that is coupled to the data network for receiving one or more packet flows therefrom;
a processor;
one or more stored sequences of instructions which, when executed by the processor, cause the processor to carry out the steps of:
receiving plaintext data;
separating the plaintext data into a first plaintext data segment A and a second plaintext data segment B;
encrypting the first plaintext data segment A using block cipher encryption and a first key, resulting in creating a first encrypted segment C;
applying an exclusive OR operation to the first encrypted segment C and a hash of the second plaintext data segment B and an associated data element Z based on a second key, resulting in creating a first intermediate result datum D;
applying an encryption operation to the first intermediate result datum D and a third key, resulting in creating an encryption output;
applying an exclusive OR operation to the encryption output and the second plaintext data segment B, resulting in creating a second intermediate result datum E;
applying an exclusive OR operation to the first intermediate result datum D and a hash of the second intermediate result and the associated data element Z using a fourth key, resulting in creating a third intermediate result datum F; and
creating, as an output ciphertext, a concatenation of the second intermediate result datum E and a decryption of third intermediate result datum F using a fifth key.

21. An apparatus as recited in claim 20, wherein the second key, third key, fourth key, and fifth key are determined based on the first key and a key derivation process.

22. An apparatus as recited in claim 20, comprising deciphering the ciphertext by performing the steps of claim 20 in inverse order.

23. An apparatus as recited in claim 20, wherein the plaintext comprises a block of data for storage in a non-volatile memory, and further comprising storing the ciphertext in the non-volatile memory.

24. An apparatus as recited in claim 20, wherein the plaintext comprises a block of data for storage in a disk drive device, and further comprising storing the ciphertext in the disk drive device.

25. An apparatus as recited in claim 20 wherein the plaintext comprises a data payload of a packet that conforms to a non-expandable data protocol, and further comprising storing the ciphertext in the packet.

26. An apparatus as recited in claim 20 wherein the plaintext comprises a data payload of a packet that conforms to Secure RTP, and further comprising storing the ciphertext in the packet.

27. An apparatus as recited in claim 20 wherein the encryption operation is AES counter-mode encryption.

28. An apparatus as recited in claim 20 wherein the encryption operation is AES OSB block cipher mode.

29. A method of encrypting a plaintext into a ciphertext, the method comprising the computer-implemented steps of:
receiving the plaintext and an auxiliary data value;
separating the plaintext into a first plaintext portion and a second plaintext portion;
generating a first hash value from the second plaintext portion and the auxiliary value using a universal hash function over $GF(2^{128})$;
performing counter-mode encryption upon the first plaintext portion in combination with the first hash value to yield an encrypted output;
generating a second hash value from the encrypted output in combination with the second plaintext portion and using the auxiliary value;
creating and storing the ciphertext based on (a) the combination of the first hash value, the second hash value and the first plaintext portion, and (b) the combination of the second plaintext portion and the encrypted output.

* * * * *

UNITED STATES PATENT AND TRADEMARK OFFICE
CERTIFICATE OF CORRECTION

PATENT NO. : 7,418,100 B2  
APPLICATION NO. : 11/201626  
DATED : August 26, 2008  
INVENTOR(S) : David A. McGrew et al.

It is certified that error appears in the above-identified patent and that said Letters Patent is hereby corrected as shown below:

In the claims:

Column 52, Claim 25, Line 15: After "20" insert --,--

Column 52, Claim 26, Line 19: After "20" insert --,--

Column 52, Claim 27, Line 23: After "20" insert --,--

Column 52, Claim 28, Line 25: After "20" insert --,--

Signed and Sealed this

Second Day of June, 2009

JOHN DOLL  
*Acting Director of the United States Patent and Trademark Office*